(12) United States Patent
Tang et al.

(10) Patent No.: US 10,560,227 B2
(45) Date of Patent: Feb. 11, 2020

(54) DOWNLINK TRANSMISSION METHOD, BASE STATION, AND TERMINAL

(71) Applicant: Huawei Technologies Co., Ltd., Shenzhen (CN)

(72) Inventors: Hao Tang, Shanghai (CN); Dongdong Wei, Shanghai (CN); Guohua Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 16/022,486

(22) Filed: Jun. 28, 2018

(65) Prior Publication Data

US 2018/0309546 A1    Oct. 25, 2018

Related U.S. Application Data

(63) Continuation of application No. PCT/CN2015/099856, filed on Dec. 30, 2015.

(51) Int. Cl.
*H04L 1/18* (2006.01)
*H04L 5/00* (2006.01)
*H04W 72/04* (2009.01)

(52) U.S. Cl.
CPC .............. *H04L 1/1812* (2013.01); *H04L 1/18* (2013.01); *H04L 1/1845* (2013.01);
(Continued)

(58) Field of Classification Search
CPC ....... H04L 1/18; H04L 1/1812; H04L 1/1845; H04L 1/1861; H04L 1/1887;
(Continued)

(56) References Cited

U.S. PATENT DOCUMENTS

2004/0137930 A1   7/2004   Kim et al.
2010/0017671 A1   1/2010   Cai et al.
(Continued)

FOREIGN PATENT DOCUMENTS

CN    102160318    8/2011
CN    102938694 A  2/2013
(Continued)

OTHER PUBLICATIONS

Nokia, "Transmission type selection in CELL_FACH state," Nokia Siemens Networks, 3GPP TSG-RAN WG1 Meeting #51, R1-074667, 8, Nov. 5-9, 2007, 2 pages, Jeju, Korea.

*Primary Examiner* — Saad A. Waqas
(74) *Attorney, Agent, or Firm* — Slater Matsil, LLP

(57) ABSTRACT

A downlink transmission method and a corresponding base station and terminal are provided. In some feasible implementations, a base station sends downlink control information to a terminal in a subframe n+k, where the downlink control information includes indication information and a HARQ process identification, the indication information is used to indicate a location of at least one OFDM symbol in data that is sent by the base station to the terminal in a subframe n, the HARQ process identification in the downlink control information is the same as a HARQ process identification in the subframe n, and both n and k are natural numbers; and the base station transmits, in the subframe n+k, at least data that is sent to the terminal and that is on the at least one OFDM symbol that is in the subframe n and that is indicated by the indication information.

19 Claims, 9 Drawing Sheets

(52) U.S. Cl.
CPC .......... *H04L 1/1861* (2013.01); *H04L 1/1887* (2013.01); *H04L 1/1896* (2013.01); *H04L 5/0055* (2013.01); *H04W 72/042* (2013.01); *H04W 72/0446* (2013.01)

(58) Field of Classification Search
CPC .. H04L 1/1896; H04L 5/0055; H04W 72/042; H04W 72/0446
See application file for complete search history.

(56) References Cited

U.S. PATENT DOCUMENTS

| | | |
|---|---|---|
| 2010/0220623 A1 | 9/2010 | Cave et al. |
| 2012/0230272 A1 | 9/2012 | Kim et al. |
| 2012/0250644 A1 | 10/2012 | Sambhwani et al. |
| 2017/0318582 A1 | 11/2017 | Au et al. |
| 2019/0223204 A1* | 7/2019 | Kim ..................... H04L 5/0055 |

FOREIGN PATENT DOCUMENTS

| | | |
|---|---|---|
| CN | 103548406 | 1/2014 |
| CN | 104620629 | 5/2015 |
| JP | 2009296182 A | 12/2009 |
| JP | 2014513454 A | 5/2014 |
| WO | 2006054171 A1 | 5/2006 |
| WO | 2014028249 A1 | 2/2014 |
| WO | 2015018084 A1 | 2/2015 |

\* cited by examiner

DOWNLINK TRANSMISSION METHOD, BASE STATION, AND TERMINAL

CROSS-REFERENCE TO RELATED APPLICATIONS

This application is a continuation of International Application No. PCT/CN2015/099856, filed on Dec. 30, 2015, the disclosure of which is hereby incorporated by reference in its entirety.

TECHNICAL FIELD

The present invention relates to the field of communications technologies, and specifically, to a downlink transmission method, a base station, and a terminal.

BACKGROUND

In various services of a mobile network at present, a video service occupies a large part of network traffic. However, a stalling phenomenon in video play severely affects user experience of a mobile video service. With introduction of new video services, such as virtual reality, the video service requires higher bandwidth and a lower delay.

In LTE/LTE-A (Long Term Evolution/Long Term Evolution Advanced), 1 ms is used as a unit (that is, 1 transmission time interval (TTI)=1 ms) to allocate a physical resource block (PRB) to a terminal (UE). There is a round trip time of 8 ms from a time at which a base station (eNB) sends a packet to a time at which the base station receives, from the UE, a feedback indicating correct receiving.

In order to reduce a round trip delay of packet transmission, a shorter TTI such as a 0.5-ms TTI or a 1-symbol-TTI is introduced. The 1-symbol TTI is used as an example. A round trip delay of transmission of one packet is eight symbols, that is, a delay less than 1 ms. With introduction of the shorter TTI, the transmission delay can be reduced, so as to meet a low-delay requirement of the video service.

The video service desires a low delay, and further desires high bandwidth due to a relatively large quantity of transmitted packets. In a scenario in which new UE supporting a 1-symbol TTI coexists with legacy UE, when the legacy UE occupies a relatively large quantity of frequency domain resources in 1 ms, if a low-delay video service bursts in this 1 ms, a relatively small quantity of time-frequency resources can be used by the new UE. This causes a delay increase.

During downlink (DL) transmission, to meet a high-bandwidth low-delay condition of the low-delay video service, a method is described as follows: A low-delay service preempts frequency domain resources on some symbols of the legacy UE, and when the low-delay service bursts in 1 ms, the base station preempts a resource element (RE) of the legacy UE, and transmits data of the low-delay service on the RE used by the legacy UE.

An advantage of the method is that the high-bandwidth low-delay requirement of the low-delay service can be met. However, in the method, incorrect receiving of the legacy UE is caused because data on some symbols of the legacy UE is not data needed by the legacy UE, and a combination gain is reduced when hybrid automatic repeat request (HARQ) combination is performed. In addition, after the legacy UE incorrectly receives data and gives the base station feedback indicating the incorrect receiving, the base station retransmits the data after 8 subframes, that is, a retransmission delay is relatively high and reaches a length of 8 subframes.

Therefore, when the new UE supporting the shorter TTI such as the 1-symbol TTI coexists with the legacy UE, after the base station preempts an RE of the legacy UE for the new UE, how to ensure receiving performance of the legacy UE is a technical problem to be resolved.

SUMMARY

Embodiments of the present invention provide a downlink transmission method, a base station, and a terminal, to improve receiving performance of the terminal.

According to a first aspect of the present invention, a downlink transmission method is provided. The method includes the following steps. A base station may send, to a terminal in a subframe n+k, downlink control information that includes indication information and a hybrid automatic repeat request (HARQ) process identification. The indication information is used to indicate a location of at least one orthogonal frequency division multiplexing (OFDM for short) symbol in data information that is sent by the base station to the terminal in a subframe n. The HARQ process identification in the downlink control information is the same as a HARQ process identification in the subframe n. Both n and k are natural numbers, and optionally, k is a natural number that is not greater than 8. The indication information may be used by the terminal to perform a corresponding operation, for example, to discard data that is on the at least one OFDM symbol indicated by the indication information and that is in data received in the subframe n, so that a receiving error can be avoided and receiving performance can be improved. In addition, the base station retransmits partial data or all data in the subframe n to the terminal in the subframe n+k, and the retransmitted data includes data that is sent to the terminal and that is on the at least one OFDM symbol that is in the subframe n and that is indicated by the indication information, so that the terminal may obtain, in the subframe n+k, the data that cannot be received in the subframe n. Therefore, correct receiving of the terminal is ensured, and further a retransmission delay is reduced because the retransmission delay is a length of k subframes. In addition, the terminal may perform joint decoding on the data received in the subframe n and the data received in the subframe n+k, so as to further improve the receiving performance.

Manners of retransmitting, by the base station, data in the subframe n+k may include but be not limited to the following three manners:

Manner 1: All data in the subframe n is retransmitted to the terminal in the subframe n+k. In this manner, all data in the subframe n is retransmitted, so that a success rate of combination, demodulation, and decoding is higher.

Manner 2: In the subframe n+k, modulated and coded data that is sent to the terminal and that is on the at least one OFDM symbol that is in the subframe n and that is indicated by the indication information is added to at least one resource block, and the data is retransmitted to the terminal. In this manner, another RB that has not been used in the subframe n+k to retransmit target data may be allocated to another UE for use, so that utilization efficiency of the subframe n+k can be improved.

Manner 3: In the subframe n+k, modulated and coded data that is sent to the terminal and that is on the at least one OFDM symbol that is in the subframe n and that is indicated by the indication information is added to at least one OFDM symbol, and the data is retransmitted to the terminal. In this manner, a same quantity of OFDM symbols are used to retransmit data in the subframe n+k, so that the terminal performs receiving and decoding more easily.

Implementations of the indication information may include but be not limited to the following several manners:

In one manner, the indication information may be information in a bitmap (bitmap) format. The indication information may include a plurality of data bits, and a value (where the value is 1 or 0) of a data bit is used to indicate whether a corresponding OFDM symbol is preempted. For example, each bit in the indication information may be corresponding to one OFDM symbol used to transmit data; or each bit in the indication information is corresponding to one group of OFDM symbols used to transmit data, where the group of OFDM symbols include at least two consecutive OFDM symbols; or each bit in the indication information is corresponding to two OFDM symbols used to transmit data, and the two OFDM symbols are two OFDM symbols that are in two timeslots in the subframe n and that have a same sequence number. In this manner, bitmap information is used for indication, and only a few data bits are needed, so that relatively a few transport bearers are occupied.

In another manner, the indication information may not be information in a bitmap (bitmap) format, but include particular indication data information, for example, include a start location of a plurality of consecutive OFDM symbols used to transmit data, and further include an end location or a length of the plurality of consecutive OFDM symbols. In this manner, when there are a plurality of indicated OFDM symbols, the OFDM symbols need to be consecutive.

After retransmitting, in the subframe n+k, partial data or all data in the subframe n, the base station may further receive feedback information that is fed back by the terminal for the subframe n and the subframe n+k according to a timing relationship in the subframe n+k. The feedback information is an acknowledgment ACK or a negative acknowledgment NACK. The terminal may not necessarily send feedback information for the subframe n, but instead, the terminal feeds back the feedback information only once for the subframe n and the subframe n+k, so as to reduce a quantity of feedbacks.

According to a second aspect of the present invention, a downlink transmission method is provided. The method is corresponding to the downlink transmission method that is performed on a base station side and that is described in the first aspect of the present invention, and includes the following steps: A terminal may receive downlink control information that is sent by a base station in a subframe n+k and that includes indication information and a HARQ process identification. Both n and k are natural numbers, The indication information is used to indicate a location of at least one OFDM symbol in data that is sent by the base station to the terminal in a subframe n. The HARQ process identification in the downlink control information is the same as a HARQ process identification in the subframe n. The terminal may perform a corresponding operation according to the indication information, for example, discard data that is on the at least one OFDM symbol indicated by the indication information and that is in the data received in the subframe n, so that a receiving error can be avoided and receiving performance can be improved. The terminal further receives data that is transmitted by the base station in the subframe n+k, that is sent to the terminal, and that is on the at least one OFDM symbol that is in the subframe n and that is indicated by the indication information. Therefore, correct receiving of the terminal is ensured, and further a retransmission delay is reduced because the retransmission delay is a length of k subframes. Then, the terminal may perform joint decoding on the data received in the subframe n and the data received in the subframe n+k, to further improve the receiving performance.

The terminal may receive the data that is retransmitted by the base station in the subframe n+k in a plurality of manners, and the retransmission manners include but are not limited to the three manners described in the first aspect of the present invention.

Implementations of the indication information may include but be not limited to the several manners described in the first aspect of the present invention.

After receiving the data in the subframe n+k, the terminal may feed back feedback information for the subframe n and the subframe n+k according to a timing relationship in the subframe n+k, that is, feed back the feedback information only once for the subframe n and the subframe n+k, so as to reduce a quantity of feedbacks.

According to a third aspect of the present invention, a base station is provided. The base station is corresponding to the downlink transmission method described in the first aspect of the present invention, and is configured to: implement the downlink transmission method, and achieve a corresponding technical effect. The base station may include a sending module and a transmission module. The sending module may send, to a terminal in a subframe n+k, downlink control information that includes indication information and a HARQ process identification. The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n. Both n and k are natural numbers. The transmission module may transmit, in the subframe n+k, at least data that is sent to the terminal and that is on the at least one OFDM symbol that is in the subframe n and that is indicated by the indication information. The indication information may be used by the terminal to perform a corresponding operation, for example, to discard data that is on the at least one OFDM symbol indicated by the indication information and that is in the data received in the subframe n, so that a receiving error can be avoided and receiving performance can be improved. In addition, the base station retransmits partial data or all data in the subframe n to the terminal in the subframe n+k, and the retransmitted data includes the data that is sent to the terminal and that is on the at least one OFDM symbol that is in the subframe n and that is indicated by the indication information, so that the terminal may obtain, in the subframe n+k, data that cannot be received in the subframe n. Therefore, correct receiving of the terminal is ensured, and further a retransmission delay is reduced because the retransmission delay is a length of k subframes. In addition, the terminal may perform joint decoding on the data received in the subframe n and the data received in the subframe n+k, so as to further improve the receiving performance.

The base station may retransmit the data to the terminal in the subframe n+k in a plurality of manners, and the retransmission manners include but are not limited to the three manners described in the first aspect of the present invention.

Implementations of the indication information may include but be not limited to the several manners described in the first aspect of the present invention.

The base station may receive feedback information that is fed back by the terminal for both the subframe n and the subframe n+k according to a timing relationship in the subframe n+k, so as to reduce a quantity of feedbacks.

According to a fourth aspect of the present invention, a terminal is provided. The terminal is corresponding to the downlink transmission method described in the second aspect of the present invention, and is configured to: implement the downlink transmission method, and achieve a corresponding technical effect. The terminal may include an information receiving module, a data receiving module, a data processing module, and a decoding module. The information receiving module may receive downlink control information that is sent by a base station in a subframe n+k and that includes indication information and a HARQ process identification. Both n and k are natural numbers, The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n. The data processing module may perform a corresponding operation according to the indication information, for example, discard data that is on the at least one OFDM symbol indicated by the indication information and that is in the data received in the subframe n, so that a receiving error can be avoided and receiving performance can be improved. The data receiving module may receive data that is transmitted by the base station in the subframe n+k, that is sent to the terminal, and that is on the at least one OFDM symbol that is in the subframe n and that is indicated by the indication information. Therefore, correct receiving of the terminal is ensured, and further a retransmission delay is reduced because the retransmission delay is a length of k subframes. The decoding module may perform joint decoding on the data received in the subframe n and the data received in the subframe n+k, so as to further improve the receiving performance.

The terminal may receive the data that is retransmitted by the base station in the subframe n+k in a plurality of manners, and the retransmission manners include but are not limited to the three manners described in the first aspect of the present invention.

Implementations of the indication information may include but be not limited to the several manners described in the first aspect of the present invention.

After receiving the data in the subframe n+k, the terminal may feed back feedback information for both the subframe n and the subframe n+k according to a timing relationship in the subframe n+k, so as to reduce a quantity of feedbacks.

According to a fifth aspect of the present invention, a base station is provided. The base station is corresponding to the downlink transmission method described in the first aspect of the present invention, and is configured to: implement the downlink transmission method, and achieve a corresponding technical effect. The base station may include a transmitter. The transmitter may send, to a terminal in a subframe n+k, downlink control information that includes indication information and a HARQ process identification. The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n. Both n and k are natural numbers. The transmitter may further transmit, in the subframe n+k, at least data that is sent to the terminal and that is on the at least one OFDM symbol that is in the subframe n and that is indicated by the indication information. The indication information may be used by the terminal to perform a corresponding operation, for example, to discard data that is on the at least one OFDM symbol indicated by the indication information and that is in the data received in the subframe n, so that a receiving error can be avoided and receiving performance can be improved. In addition, the base station retransmits partial data or all data in the subframe n to the terminal in the subframe n+k, and the retransmitted data includes the data that is sent to the terminal and that is on the at least one OFDM symbol that is in the subframe n and that is indicated by the indication information, so that the terminal may obtain, in the subframe n+k, data that cannot be received in the subframe n. Therefore, correct receiving of the terminal is ensured, and further a retransmission delay is reduced because the retransmission delay is a length of k subframes. In addition, the terminal may perform joint decoding on the data received in the subframe n and the data received in the subframe n+k, so as to further improve the receiving performance.

Manners of retransmitting, by the base station, data in the subframe n+k may include but be not limited to the following three manners:

Manner 1: The transmitter retransmits, in the subframe n+k, all data in the subframe n to the terminal. In this manner, all data in the subframe n is retransmitted, so that a success rate of combination, demodulation, and decoding is higher.

Manner 2: In the subframe n+k, the transmitter adds, to at least one resource block, modulated and coded data that is sent to the terminal and that is on the at least one OFDM symbol that is in the subframe n and that is indicated by the indication information, and retransmits the data to the terminal. In this manner, another RB that has not been used in the subframe n+k to retransmit target data may be allocated to another UE for use, so that utilization efficiency of the subframe n+k can be improved.

Manner 3: In the subframe n+k, the transmitter adds, to at least one OFDM symbol, modulated and coded data that is sent to the terminal and that is on the at least one OFDM symbol that is in the subframe n and that is indicated by the indication information, and retransmits the data to the terminal. In this manner, a same quantity of OFDM symbols are used to retransmit data in the subframe n+k, so that the terminal performs receiving and decoding more easily.

Implementations of the indication information may include but be not limited to the following several manners:

In one manner, the indication information may be information in a bitmap (bitmap) format. The indication information may include a plurality of data bits, and a value (where the value is 1 or 0) of a data bit is used to indicate whether a corresponding OFDM symbol is preempted. For example, each bit in the indication information may be corresponding to one OFDM symbol used to transmit data; or each bit in the indication information is corresponding to one group of OFDM symbols used to transmit data, where the group of OFDM symbols include at least two consecutive OFDM symbols; or each bit in the indication information is corresponding to two OFDM symbols used to transmit data, and the two OFDM symbols are two OFDM symbols that are in two timeslots in the subframe n and that have a same sequence number. In this manner, bitmap information is used for indication, and only a few data bits are needed, so that relatively a few transport bearers are occupied.

In another manner, the indication information may not be information in a bitmap (bitmap) format, but include particular indication data information, for example, include a start location of a plurality of consecutive OFDM symbols used to transmit data, and further include an end location or a length of the plurality of consecutive OFDM symbols. In this manner, when there are a plurality of indicated OFDM symbols, the OFDM symbols need to be consecutive.

The base station may further include a receiver. The receiver may receive feedback information that is fed back by the terminal for the subframe n and the subframe n+k according to a timing relationship in the subframe n+k. In this manner, the terminal may not necessarily send feedback information for the subframe n, but instead, the terminal feeds back the feedback information only once for the subframe n and the subframe n+k, so as to reduce a quantity of feedbacks.

The base station may further include a processor. The processor may preempt at least one OFDM symbol of the terminal in the subframe n. The indication information is specifically used to indicate a location of the at least one preempted OFDM symbol.

According to a sixth aspect of the present invention, a terminal is provided. The terminal is corresponding to the downlink transmission method described in the second aspect of the present invention, and is configured to: implement the downlink transmission method, and achieve a corresponding technical effect. The terminal may include a receiver and a processor. Corresponding to the base station described in the fifth aspect of the present invention, the receiver of the terminal may receive downlink control information that is sent by a base station in a subframe n+k and that includes indication information and a HARQ process identification. Both n and k are natural numbers. The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n. The receiver may further perform a corresponding operation according to the indication information, for example, discard data that is on the at least one OFDM symbol indicated by the indication information and that is in the data received in the subframe n, so that a receiving error can be avoided and receiving performance can be improved. The receiver may further receive data that is transmitted by the base station in the subframe n+k, that is sent to the terminal, and that is on the at least one OFDM symbol that is in the subframe n and that is indicated by the indication information. Therefore, correct receiving of the terminal is ensured, and further a retransmission delay is reduced because the retransmission delay is a length of k subframes. The processor may perform joint decoding on the data received in the subframe n and the data received in the subframe n+k, so as to further improve the receiving performance.

The terminal may receive the data that is retransmitted by the base station in the subframe n+k in a plurality of manners, and the retransmission manners include but are not limited to the three manners described in the fifth aspect of the present invention.

Implementations of the indication information may include but be not limited to the several manners described in the fifth aspect of the present invention.

The terminal may include a transmitter. The transmitter may feed back feedback information for the subframe n and the subframe n+k according to a timing relationship in the subframe n+k, that is, feedback the feedback information only once for the subframe n and the subframe n+k, so as to reduce a quantity of feedbacks.

It may be learned from the foregoing that in some feasible implementations of embodiments of the present invention, the base station sends the indication information to the terminal in the subframe n+k, to instruct the terminal to perform a corresponding operation according to the indication information, for example, to discard the data that is received on the at least one indicated OFDM symbol in the subframe n, and retransmits the data to the terminal in the subframe n+k. Therefore, correct receiving of the terminal is ensured, a retransmission delay is reduced, and receiving performance of the terminal is improved.

DETAILED DESCRIPTION OF ILLUSTRATIVE EMBODIMENTS

To make a person skilled in the art understand the solutions in the present invention better, the following describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", and the like are intended to distinguish between different objects but do not indicate a particular order. In addition, the terms "include", "have", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

Although an LTE system is used as an example for introduction in the foregoing background part, a person skilled in the art should understand that the present invention is applicable not only to the LTE system but also to other wireless communications systems, such as a Global System for Mobile Communications (GSM), a Universal Mobile Telecommunications System (UMTS), a Code Division Multiple Access (CDMA) system, and a new network system. The following describes specific embodiments by using the LTE system as an example.

A terminal in the embodiments of the present invention may be user equipment, a device that provides voice and/or data connectivity for a user, a handheld device that has a wireless connection function, or the like. For example, the terminal may be a mobile terminal such as a mobile phone (also referred to as a "cellular" phone), or may be a computer with a mobile terminal, such as a portable, pocket-sized, handheld, computer built-in, or in-vehicle mobile apparatus. The terminal may be connected to a radio access network (RAN) by using a base station (eNB), to communicate with at least one core network.

The base station (eNB) in the embodiments of the present invention may be a mobile communications base station. The mobile communications base station is a form of a radio station and is a radio transceiver station that performs information communication with the terminal in a particular radio coverage area by using a mobile communications switching center. For example, the base station (eNB) may be a macro base station, a micro base station, a picocell base station, or a distributed base station.

Figure 1:
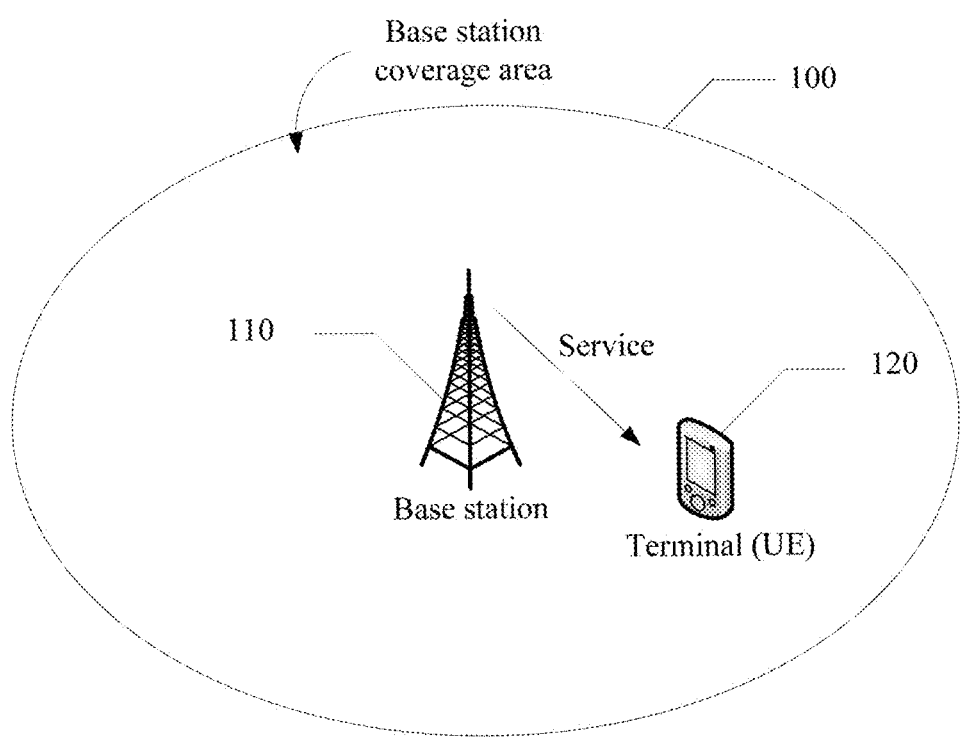
FIG. 1 is a schematic architectural diagram of a communications system according to an embodiment of the present invention.

Referring to FIG. 1, FIG. 1 is a schematic architectural diagram of a communications system according to an embodiment of the present invention. A communications system 100 may include a base station 110 and a terminal 120.

The following first describes a downlink transmission technology in LTE/LTE-A.

1. Downlink Resource Mapping in LTE/LTE-A

An orthogonal frequency division multiple access (OFDMA) technology is used during downlink transmission in the LTE/LTE-A. OFDMA is evolved from an orthogonal frequency division multiplexing (OFDM) technology, and is a combination of the OFDM technology and a Frequency Division Multiple Access (FDMA) technology.

Figure 2:
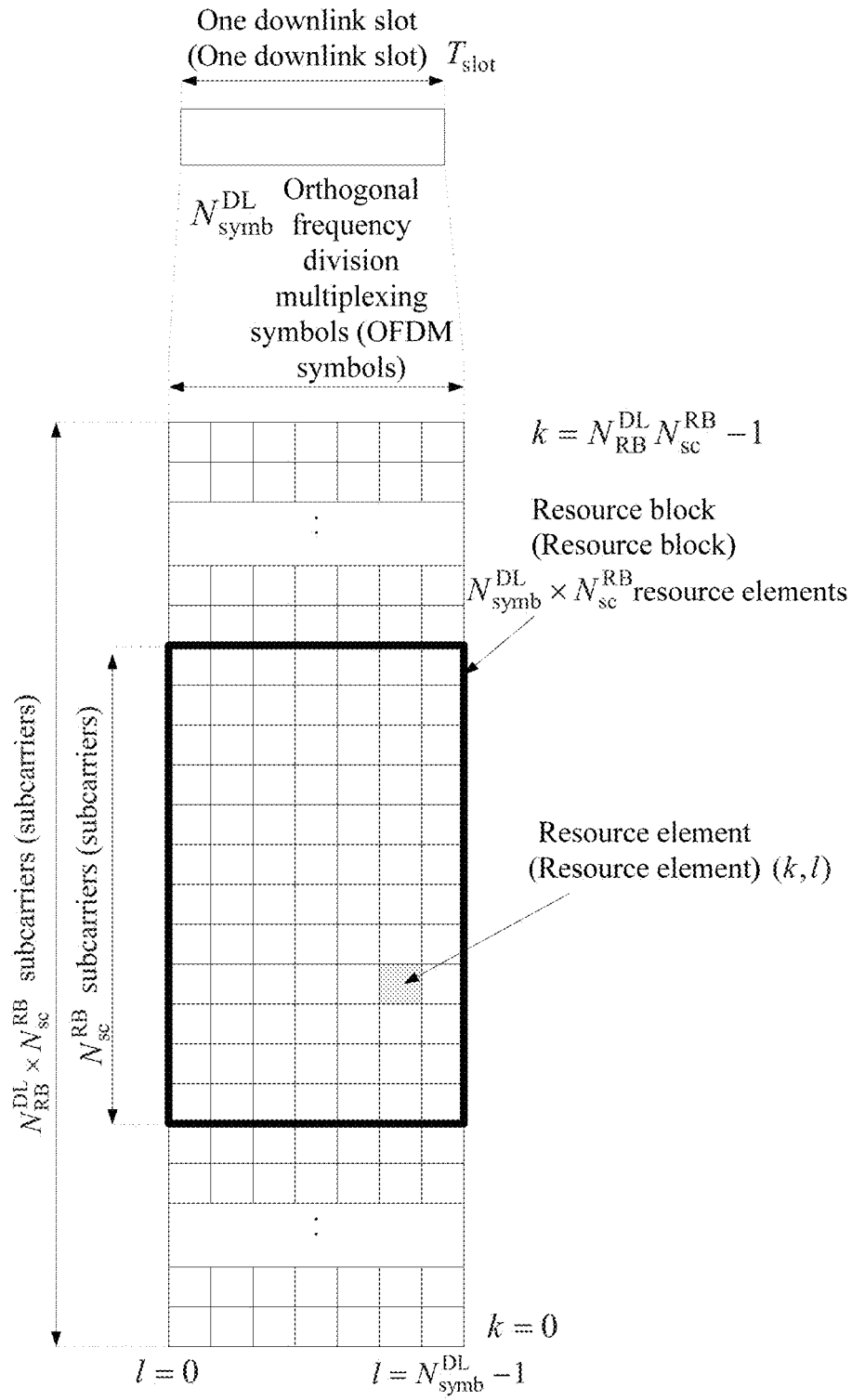
FIG. 2 is a schematic diagram of downlink resource mapping in LTE/LTE-A.

In a time domain, one radio frame has a length of 10 ms and includes 10 subframes. Each subframe is 1 ms, and each subframe includes two timeslots (slot). Each timeslot includes seven symbols (in a case of a normal CP) or six symbols (in a case of an extended CP is used) OFDM. Referring to FIG. 2, in a frequency domain, a resource block (RB) includes a plurality of subcarriers, and one subcarrier in one OFDM symbol is called a resource element (RE). The RB is a smallest unit for downlink resource allocation in LTE/LTE-A, and one RB includes 12 consecutive subcarriers and one timeslot. Resource blocks are classified into a physical resource block (PRB) and a virtual resource block (VRB). The PRB means a location of an actual frequency of the resource block, and PRBs are numbered in ascending order. The VRB is a form obtained by renumbering the PRB, and the VRB may be mapped onto the PRB in a plurality of manners. The base station may allocate a resource in one subframe by using a PRB pair (that is, PRBs in two slots) as a unit.

Figure 3:
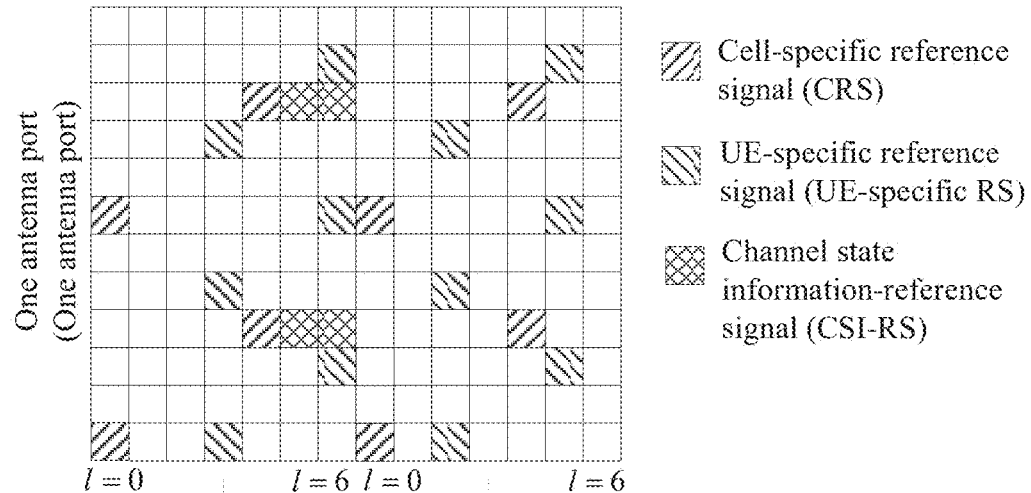
FIG. 3 is a schematic diagram of mapping of a pilot signal onto an RB.

Referring to FIG. 3, some REs in one RB may be used as pilots, such as a cell-specific reference signal (CRS), a UE-specific reference signal (UE-specific RS), and a channel state information-reference signal (CSI-RS).

2. HARQ Process

In LTE, a HARQ protocol is used to perform retransmission, and in a HARQ, a stop-and-wait protocol is used to send data.

In the stop-and-wait protocol, after sending a transport block (TB), a transmit end stops to wait for feedback information. The feedback information includes an ACK (acknowledgment) or a NACK (negative acknowledgment). A receive end may use i-bit information to feed back an ACK or a NACK for the TB.

Figure 4:
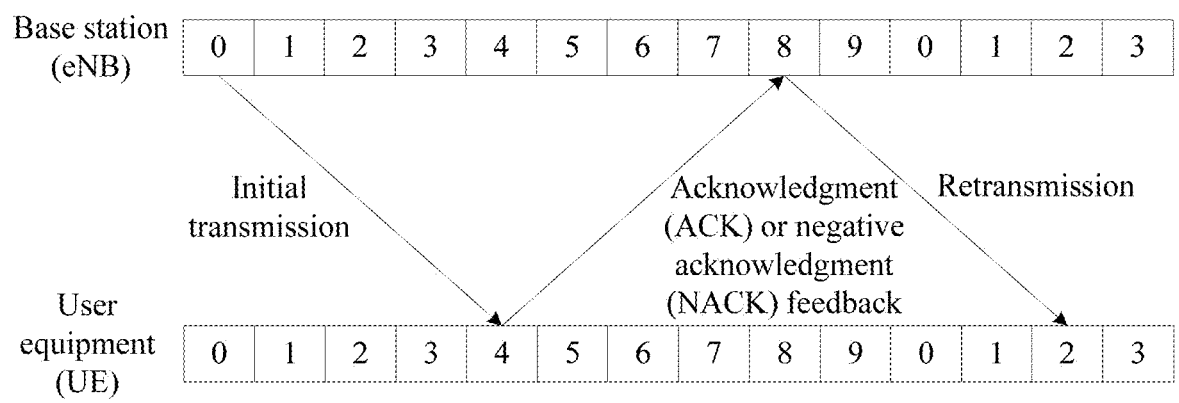
FIG. 4 is a schematic diagram of a conventional downlink HARQ.

As shown in FIG. 4, a base station eNB transmits downlink data in a subframe 0 (or a subframe n, where n is a natural number), and a terminal feeds back an ACK/a NACK in a subframe 4 (or a subframe n+4). If the data is correctly decoded, an ACK is fed back. If the data is incorrectly decoded, a NACK is fed back. If the eNB receives the NACK, the eNB retransmits the data in a subframe 8 (or a subframe n+8).

However, each time after transmission, the transmit end stops to wait for an acknowledgment, and therefore an extremely low throughput is caused. Therefore, in the LTE, eight concurrent stop-and-wait processes are used or eight HARQ processes are used: When one HARQ process waits for feedback information, the transmit end may continuously send data by using another HARQ process. During downlink transmission, a HARQ process ID may be indicated in downlink control information (DCI).

When the base station receives a NACK feedback after sending downlink data in a subframe n by using a HARQ process, the base station retransmits the data in a subframe n+8 by using the same HARQ process. The terminal may perform joint decoding on the received subframe n and subframe n+8. This is referred to as HARQ combination. For the HARQ combination, joint decoding may be performed on two or more subframes.

A downlink transmission method, a base station, and a terminal are provided in the embodiments of the present invention and are separately described below in detail by using specific embodiments.

(Embodiment 1)

Figure 5:
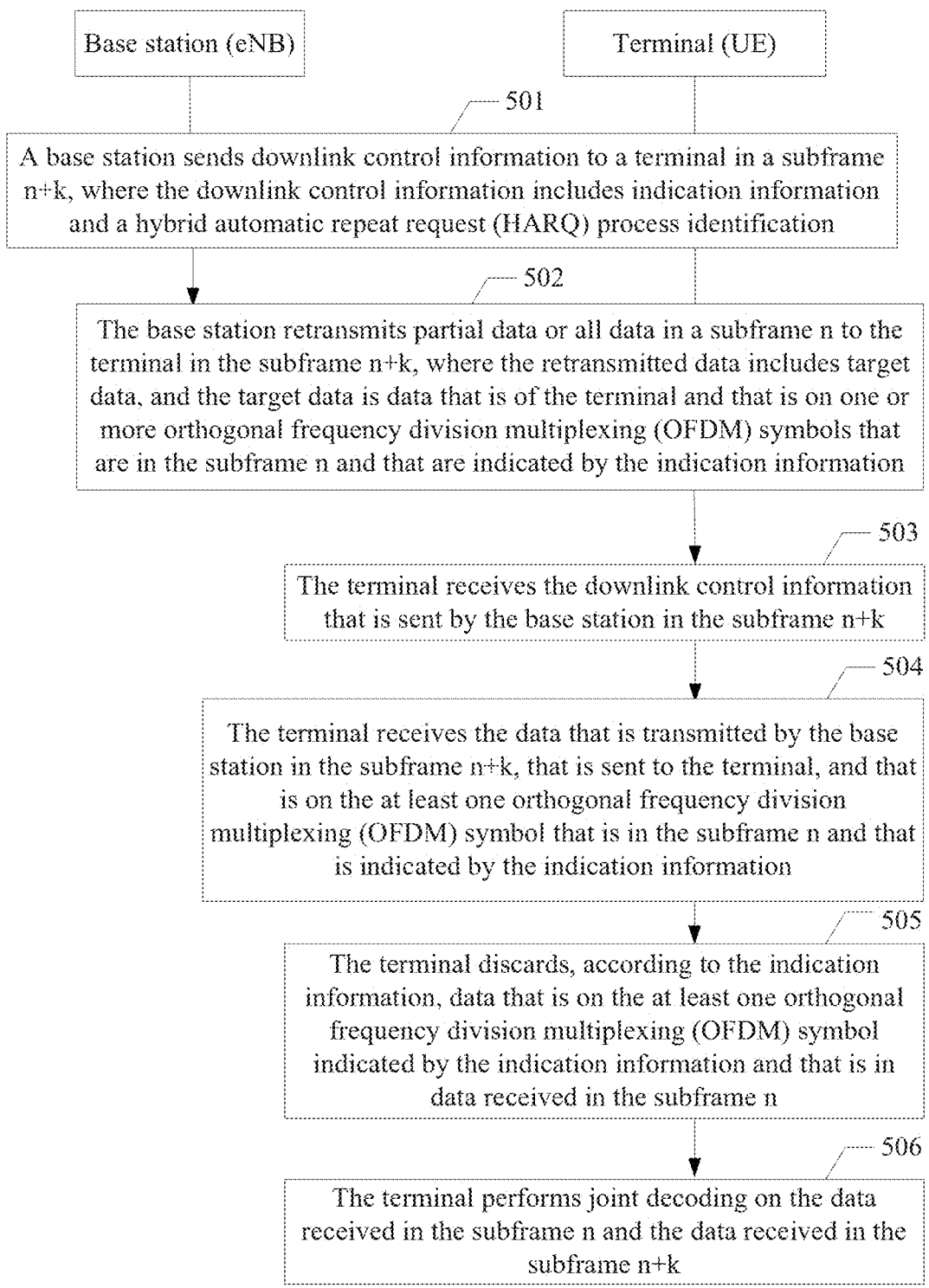
FIG. 5 is a schematic flowchart of a downlink transmission method according to an embodiment of the present invention.

Referring to FIG. 5, an embodiment of the present invention provides a downlink transmission method that may include the following steps.

501. A base station sends downlink control information to a terminal in a subframe n+k, where the downlink control information includes indication information and a hybrid automatic repeat request (HARQ) process identification (ID), the indication information is used to indicate a location of at least one OFDM symbol in data information that is sent by the base station to the terminal in a subframe n, the HARQ process ID in the downlink control information is the same as a HARQ process ID in the subframe n, and both n and k are natural numbers.

In this step, the base station gives an indication to the terminal in the subframe n+k by using the indication information in the downlink control information, to notify the terminal of the location of the at least one OFDM symbol in the subframe n, so that the terminal may perform a corresponding operation according to the indication information. For example, if the location that is of the at least one OFDM symbol and that is indicated by the indication information refers to error data in data received by the terminal in the subframe n, the terminal may discard error data according to the indication information.

In some embodiments, the at least one OFDM symbol indicated by the indication information may be a preempted OFDM symbol. In a scenario in which a plurality of terminals using different time lengths as TTIs coexist, for example, in a scenario in which a terminal using a 1-ms TTI coexists with a terminal using a p-symbol TTI, where p is a natural number and indicates one or more OFDM symbols, in the subframe n, when a terminal using a relatively short TTI has a burst low-delay service, the base station may preempt at least one OFDM symbol of a terminal using a relatively long TTI. An example in which three RBs are allocated to the preempted terminal is used. A frequency domain includes 36 subcarriers in total, and preempting one OFDM symbol means preempting 36 REs. Data transmitted on the preempted OFDM symbol does not belong to the terminal, and therefore incorrect receiving of the terminal is caused. In this case, the data on the preempted OFDM symbol may be discarded. It should be noted that in some other embodiments, for another reason, the base station may instruct, by using the indication information, the terminal to discard data on the at least one OFDM symbol in the subframe n.

Optionally, in some embodiments of the present invention, the downlink control information may be extended. A field may be added to the downlink control information, and the field is used to carry the indication information. For example, the indication information may be carried in an extended field of the downlink control information in the subframe n+k. Extending the downlink control information to give an indication is easily implement and may be relatively easily applied to an existing communications network, and a dynamic indication can be implemented. In some other implementations, it may be considered that higher layer signaling is used to carry the indication information.

502. The base station transmits, in the subframe n+k, at least data that is sent to the terminal and that is on the at least one OFDM symbol that is in the subframe n and that is indicated by the indication information.

Alternatively, the base station retransmits partial data or all data in the subframe n to the terminal in the subframe n+k. The retransmitted data includes target data, and the target data is the data that is sent to the terminal and that is on the at least one OFDM symbol that is in the subframe n and that is indicated by the indication information.

It is understood that data actually transmitted on the at least one OFDM symbol that is in the subframe n and that is indicated by the indication information is not data of the terminal, and the data (that is, the target data) that should be sent by the base station to the terminal on the at least one OFDM symbol that is in the subframe n and that is indicated by the indication information fails to be sent for a reason such as preemption. Therefore, the base station retransmits the target data to the terminal in the subframe n+k.

Different from the current system in which data is retransmitted in the subframe n+8 only after a NACK fed back by the terminal is received, in this embodiment of the present invention, the target data is retransmitted in the subframe n+k. In this way, a retransmission delay can be reduced. All data or only partial data in the subframe n may be retransmitted.

503. The terminal receives the downlink control information that is sent by the base station in the subframe n+k, where the downlink control information includes the indication information and the hybrid automatic repeat request HARQ process identification.

504. The terminal receives the data that is transmitted by the base station in the subframe n+k, that is sent to the terminal, and that is on the at least one OFDM symbol that is in the subframe n and that is indicated by the indication information.

That is, the terminal receives partial data or all data that is in the subframe n and that is retransmitted by the base station in the subframe n+k. The retransmitted data includes the target data.

505. The terminal performs a corresponding operation according to the indication information, for example, discards data that is on the at least one OFDM symbol indicated by the indication information and that is in data received in the subframe n.

The terminal buffers data symbol information (that is, directly-received data on a plurality of OFDM symbols, rather than soft bit information obtained after soft decision decoding) received in the subframe n, and may discard the data on the at least one OFDM symbol that is in the subframe n and that is indicated by the indication information, so as to avoid a receiving error, and prevent more errors and a higher retransmission delay from being caused during subsequent HARQ combination.

506. The terminal performs joint decoding on the data received in the subframe n and the data received in the subframe n+k.

The terminal may perform joint decoding (for example, soft decision decoding) on the data received in the subframe n and the data received in the subframe n+k, to obtain correct data. Because the error data in the subframe n is discarded in advance, when joint decoding and HARQ combination are performed, a combination gain can be improved, and a combination success rate can be increased.

After receiving the subframe n and the subframe n+k, the terminal may further send feedback information to the base station. The feedback information is an ACK or a NACK. In the specification, two feedback manners are provided: One is the same as a conventional feedback manner, and the other is feeding back feedback information for the subframe n and the subframe n+k according to a timing relationship in the subframe n+k. The two feedback manners are separately described below in detail:

For an FDD (Frequency Division Duplex) HARQ:

In one manner, the terminal respectively feeds back, in a subframe n+4 and a subframe n+k+4, feedback information for a subframe n and that for a subframe n+k. This manner is the same as the conventional feedback manner.

In another manner, the terminal feeds back, in a subframe n+k+4, feedback information for a subframe n and a subframe n+k, that is, for the two subframes n and n+k, and the feedback information is fed back only once in the subframe n+k+4. In such a feedback manner, actually, a quantity of feedbacks is reduced, the feedback manner is simplified, and some uplink transmission resources are released.

For a TDD (Time Division Duplex) HARQ:

As shown in Table 1, Table 1 is a TDD configuration table, and seven configuration manners 0 to 6 are shown in total in the table. Allocation statuses of 10 subframes 0 to 9 in a frame are defined in each configuration manner, where D denotes downlink, U denotes uplink, and S denotes a special subframe. The terminal may perform uplink transmission on a subframe denoted as U.

TABLE 1

TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 2, Table 2 shows a TDD HARQ timing relationship: In TDD, for PDSCHs (physical downlink shared channel) sent in a plurality of downlink subframes, an ACK or a NACK may need to be replied in one uplink subframe. If the terminal detects PDSCH transmission in a downlink subframe n−q, the terminal feeds back an ACK or a NACK in an uplink subframe n, where q∈Q. For different TDD configurations, Q is shown in the following table:

TABLE 2

TDD HARQ timing relationship

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the foregoing table, "-" indicates that an ACK or a NACK is not allowed to be fed back in this subframe. A configuration manner "1" is used as an example. An ACK or a NACK may be fed back in subframes 2, 3, 7, and 8, and a feedback may be given in a subframe 2 for a subframe n−6 or n−7 (n indicates a sequence number of the subframe 2).

In the specification, two feedback manners are provided for the TDD HARQ:

In one manner, the foregoing Table 2 is queried, and feedback information is separately sent for the subframe n and the subframe n+k according to a query result. This manner is the same as the conventional feedback manner.

In another manner, a timing relationship in the subframe n+k is determined by querying the foregoing Table 2, and feedback information for the subframe n and that for the subframe n+k are simultaneously fed back in a corresponding subframe, that is, feedback information is fed back only once for the two subframes n and n+k in the corresponding subframe. In such a feedback manner, actually, a quantity of feedbacks is reduced, the feedback manner is simplified, and some uplink transmission resources are released.

The base station may receive the feedback information that is fed back by the terminal for the subframe n and the subframe n+k according to the timing relationship in the subframe n+k, to learn whether the terminal performs correct receiving.

In this embodiment of the present invention, there are a plurality of manners of using the indication information to indicate the preempted OFDM symbol, and the manners include but are not limited to the following several manners:

Manner 1: The indication information is information in a bitmap format, each bit in the indication information is corresponding to one OFDM symbol used to transmit data information, and 1 or 0 is used to indicate whether a corresponding OFDM symbol is indicated. For example, 1 is used to indicate that the corresponding OFDM symbol is indicated, and 0 is used to indicate that the corresponding OFDM symbol is not indicated.

An example in which one subframe includes 14 OFDM symbols in a case of a normal CP is used. When a bitmap is used for indication in this manner, because OFDM symbols (which may be used as pilots, for example, there are three OFDM symbols) occupied by a PDCCH are not preempted, the three OFDM symbols may not be considered. The remaining 11 OFDM symbols are indicated by using an 11-bit (bit) bitmap, and each bit indicates whether one OFDM symbol is preempted. For example, 1 indicates that the OFDM symbol is preempted, and 0 indicates that the OFDM symbol is not preempted.

Manner 2: Similar to manner 1, the indication information is still information in a bitmap format, but each bit in the indication information is corresponding to one group of OFDM symbols used to transmit data information, the group of OFDM symbols include at least two consecutive OFDM symbols, and 1 or 0 is used to indicate whether a corresponding group of OFDM symbols are indicated. That is, a bitmap is used for indication, and a symbol group manner is used for representation. For example, OFDM symbols 3 and 4 are in one group, and one bit is used to indicate whether the group is preempted.

Manner 3: Similar to manner 2, the indication information is still information in a bitmap format, and each bit in the indication information is corresponding to two OFDM symbols used to transmit data information. However, the two OFDM symbols are two OFDM symbols that are in two timeslots (slot) in the subframe n and that have a same sequence number. In other words, it may be considered that locations of the preempted OFDM symbols in the two slots are the same, and indicate a bitmap of one slot.

Manner 4: The indication information includes a start location of a plurality of consecutive OFDM symbols used to transmit data information, and further includes an end location or a length of the plurality of consecutive OFDM symbols.

For example, there may be a limitation that the base station can preempt only consecutive OFDM symbols, and the terminal is notified, in the indication information, of a start location (that is, a sequence number of a first preempted OFDM symbol) and a length (that is, a quantity of the consecutive preempted OFDM symbols) of the consecutive preempted OFDM symbols.

If there is a limitation that the base station can preempt a maximum of two sections of consecutive OFDM symbols, the terminal may be notified, in the indication information, of a start location (that is, a sequence number of a first preempted OFDM symbol) and an end location (that is, a sequence number of a last preempted OFDM symbol) of each of the two sections of consecutive preempted OFDM symbols, or a start location and a length of each of the two sections.

It should be noted that k may be a natural number that is not greater than 8, for example, 1, 2, or 3. In some embodiments, k may be set to an RTT (Round Trip Time), that is, a timeslot in which new downlink control information is delivered is the same as a timeslot in which downlink control information retransmitted by a HARQ process is delivered, and the new downlink control information may carry the retransmitted information of the HARQ process. For example, k=8, and new downlink control information (including downlink control information that indicates a location of an OFDM symbol in the subframe n) is sent in a subframe n+8. Original downlink control information does not need to be sent, and the retransmitted information is put into the new downlink control information.

It may be learned from the foregoing that in some feasible implementations of the present invention, the indication information is used to instruct the terminal to perform a corresponding operation on the data on the at least one indicated OFDM symbol, for example, to instruct the terminal to discard the error data that is received on the at least one OFDM symbol in the subframe n, so that a receiving error can be avoided and receiving performance can be improved. Partial data or all data in the subframe n is retransmitted in the subframe n+k, and the retransmitted data includes the data that is sent to the terminal and that is on the at least one OFDM symbol that is in the subframe n and that is indicated by the indication information. Therefore, correct receiving of the terminal is ensured, and further a retransmission delay is reduced because the retransmission delay is a length of k subframes. In addition, the terminal may perform joint decoding on the data received in the subframe n and the data received in the subframe n+k, so as to further improve the receiving performance. During joint decoding (that is, HARQ combination), because the error data in the subframe n is discarded in advance, a combination gain can be improved, and a success rate can be increased. In summary, a success rate of correct receiving of the terminal is effectively increased, the retransmission delay is reduced, and the receiving performance of the terminal is improved.

In this embodiment of the present invention, there may be a plurality of retransmission manners of retransmitting, in the subframe n+k, partial data or all data in the subframe n. The following uses implementations in a plurality of specific scenarios as examples to further describe several retransmission manners.

Figure 6:
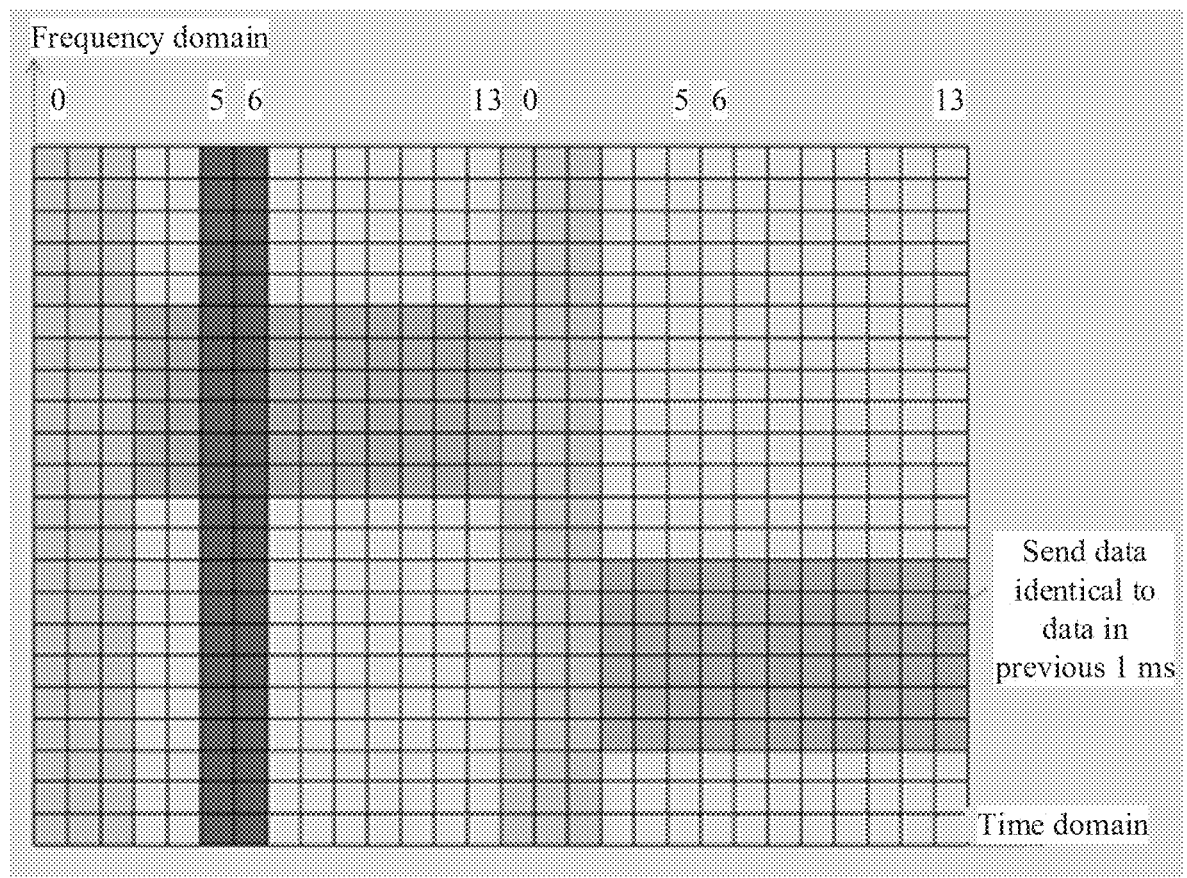
FIG. 6 is a schematic diagram of downlink resource mapping in a retransmission manner 1 according to the present invention.

Retransmission Manner 1:

In this embodiment, a process of transmitting, by the base station in the subframe n+k, the at least data that is sent to the terminal and that is on the at least one OFDM symbol that is in the subframe n and that is indicated by the indication information includes: retransmitting, by the base station, all data in the subframe n to the terminal in the subframe n+k. In addition, a same HARQ process ID is used in the subframe n+k and in the subframe n. The following uses an example for description:

Referring to FIG. 6, the base station transmits downlink data of UE 1 in the subframe n, and a low-delay service needs to be transmitted on a fifth symbol in the subframe n. To ensure a delay requirement for the low-delay service, the base station preempts subcarriers on an OFDM symbol 5 and an OFDM symbol 6 in an RB used by the UE 1.

An example in which k=1 is used. In a subframe n+1, the base station includes indication information to downlink control information sent to the UE 1, to indicate a location of an OFDM symbol of the UE 1 that is in the subframe n and that is preempted by the base station. In addition, in the subframe n+1, the base station retransmits all data in the subframe n to the UE 1, and uses a same HARQ process ID. Because a subframe length is 1 ms, it may be considered that data identical to data in previous 1 ms is sent in a next subframe.

If the UE receives the downlink control information in the subframe n+1 and learns the location of the preempted OFDM symbol in the subframe n, the UE removes data received on the OFDM symbol 5 and the OFDM symbol 6 in the subframe n, and then performs combination, demodulation, and decoding on the data received in the subframe n and the data received in the subframe n+1.

It should be noted that, before sending data to the UE, the base station needs to modulate and code original data, and maps modulated and coded data onto a plurality of REs in a downlink data frame for downlink transmission. After demodulation and decoding, the UE may obtain original information of the data.

In this embodiment, all data in the subframe n is retransmitted in the subframe n+k. Therefore, a modulation and coding manner that is the same as or different from that in the subframe n may be used in the subframe n+k.

In this embodiment, after receiving a downlink subframe, the UE buffers original time-frequency domain information of the data for combination, demodulation, and decoding in a plurality of subframes, so as to improve receiving performance.

In this embodiment, all data in the subframe n rather than only the target data is retransmitted in the subframe n+k, so that a success rate of combination, demodulation, and decoding is higher.

Figure 7:
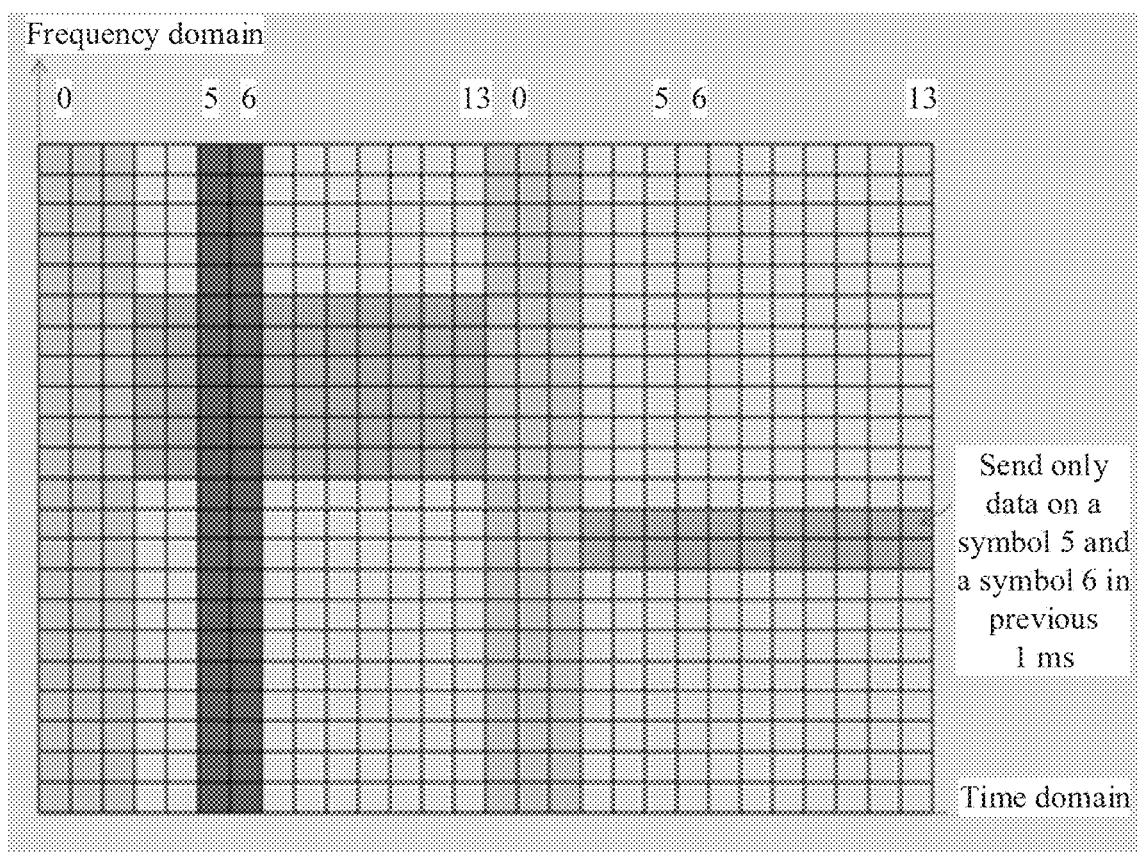
FIG. 7 is a schematic diagram of downlink resource mapping in a retransmission manner 2 according to the present invention.

Retransmission Manner 2:

In this embodiment, a process of transmitting, by the base station in the subframe n+k, the at least data that is sent to the terminal and that is on the at least one OFDM symbol that is in the subframe n and that is indicated by the indication information includes: in the subframe n+k, adding, by the base station to at least one resource block RB, modulated and coded data that is sent to the terminal and that is on the at least one OFDM symbol that is in the subframe n and that is indicated by the indication information, and retransmitting the data to the terminal. The following uses an example for description:

Referring to FIG. 7, the base station transmits downlink data of UE 1 in the subframe n, and a low-delay service needs to be transmitted on a fifth OFDM symbol in the subframe n. To ensure a delay requirement for the low-delay service, the base station preempts subcarriers on an OFDM symbol 5 and an OFDM symbol 6 in an RB used by the UE 1.

An example in which k=1 is used. In a subframe n+1, the base station includes indication information to downlink control information sent to the UE 1, to indicate a location of an OFDM symbol of the UE 1 that is in the subframe n and that is preempted by the base station.

In this embodiment, the base station retransmits, in the subframe n+1, only the target data on the preempted OFDM symbol in the subframe n rather than all data. Therefore, a modulation and coding manner that is the same as that in the subframe n needs to be used in the subframe n+1, that is, the target data is modulated and coded data that is mapped, in the subframe n, onto the at least one OFDM symbol indicated by the indication information.

That is, data (that is, data carried on the OFDM symbol 5 and the OFDM symbol 6 in this embodiment) that has not been sent in the subframe n after the at least one OFDM symbol is preempted needs to be sent in the subframe n+1. The data in the subframe n is modulated and coded, and then is mapped onto REs. Information mapped onto the OFDM symbol 5 and the OFDM symbol 6 is sent in the subframe n+1, and modulation and coding does not need to be performed in the subframe n+1. For example, if 72 REs are preempted, information that has not been sent in the subframe n and that is on the preempted 72 REs is sent in the subframe n+1 by using 72 REs. Because a subframe length is 1 ms, it may be considered that data that is on a symbol 5 and a symbol 6 in previous 1 ms is sent in a next subframe.

For example, in the subframe n, the base station allocates three RBs (which occupy 36 subcarriers in a frequency domain) to the UE 1, and preempts REs on the OFDM symbol 5 and the OFDM symbol 6, that is, preempts 72 REs in total. In the subframe n+1, the base station may use one RB (that has over 72 data REs) to send modulated and coded data on the 72 REs to the UE 1. A mapping sequence is first frequency domain last time domain. Optionally, a remaining unallocated idle RE may be filled with 0, or target data on the 72 REs is copied for filling until all REs in the RB are occupied, so as to improve receiving performance.

If the UE receives the downlink control information in the subframe n+1 and learns the location of the preempted OFDM symbol in the subframe n, the UE removes data that is received on the corresponding OFDM symbol and that is in the data received in the subframe n, and then performs combination, demodulation, and decoding on the data received in the subframe n and the data received in the subframe n+1. It may be learned that in this embodiment, after receiving a downlink subframe, the UE buffers original time-frequency domain information of the data for combination, demodulation, and decoding in a plurality of subframes, so as to improve receiving performance.

It should be noted that another RB that has not been used in the subframe n+k to retransmit the target data may be allocated to another UE for use, so that utilization efficiency of the subframe n+k can be improved.

Figure 8:
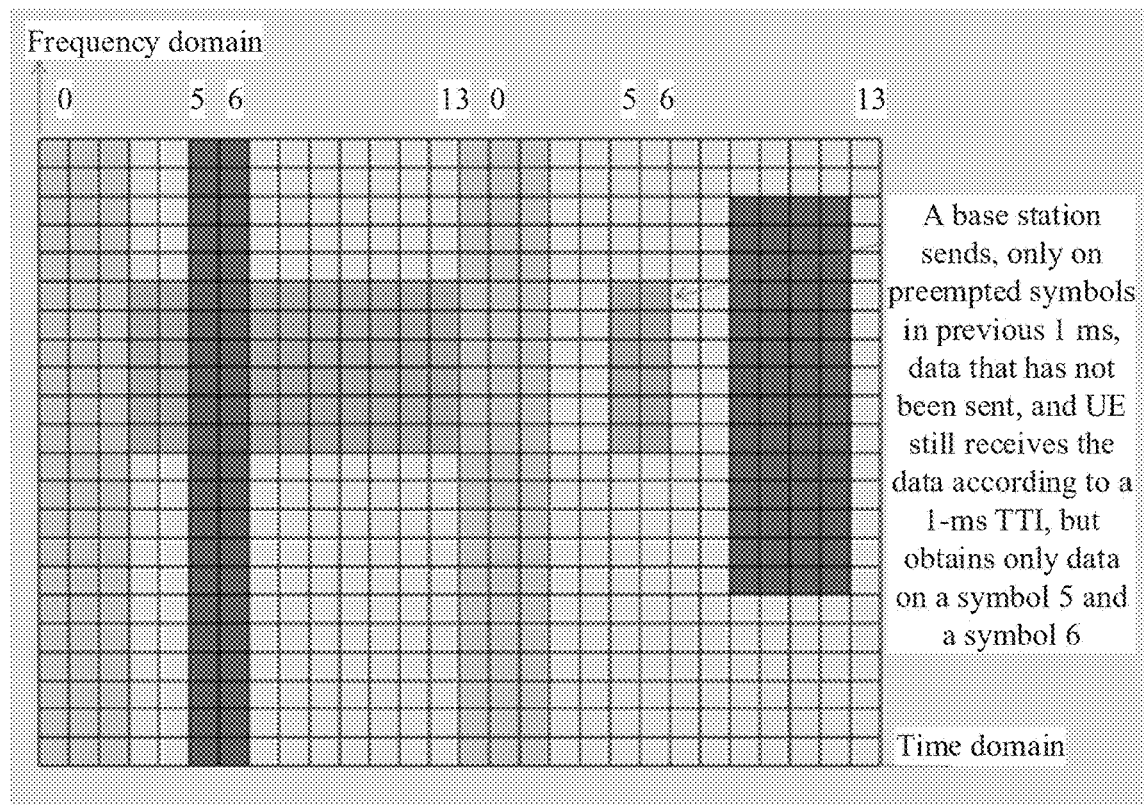
FIG. 8 is a schematic diagram of downlink resource mapping in a retransmission manner 3 according to the present invention.

Retransmission Manner 3:

In this embodiment, a process of transmitting, by the base station in the subframe n+1, the at least data that is sent to the terminal and that is on the at least one OFDM symbol that is in the subframe n and that is indicated by the indication information includes: in the subframe n+1, adding, by the base station to at least one OFDM symbol, modulated and coded data that is sent to the terminal and that is on the at least one OFDM symbol that is in the subframe n and that is indicated by the indication information, and retransmitting the data to the terminal. The following uses an example for description:

Referring to FIG. 8, the base station transmits downlink data of a UE1 in the subframe n, and a low-delay service needs to be transmitted on a fifth symbol in the subframe n. To ensure a delay requirement for the low-delay service, the base station preempts subcarriers on a symbol 5 and a symbol 6 in an RB used by the UE1.

An example in which k=1 is used. In a subframe n+1, the base station includes indication information to downlink control information sent to the terminal 1, to indicate locations of the OFDM symbol 5 and the OFDM symbol 6 of the terminal 1 that are in the subframe n and that are preempted by the base station.

Similar to the retransmission manner 2 in this embodiment, the base station retransmits, in the subframe n+1, only the target data on the preempted OFDM symbol in the subframe n rather than all data. Therefore, a modulation and coding manner that is the same as that in the subframe n needs to be used in the subframe n+1, that is, the target data is modulated and coded data that is mapped, in the subframe n, onto the at least one OFDM symbol indicated by the indication information. Because a subframe length is 1 ms, it may be considered that data in previous 1 ms is sent on at least one OFDM symbol in a next subframe. In addition, the data that has not been sent is sent only on the preempted OFDM symbols in the previous 1 ms, and the UE still receives the data according to a 1-ms TTI, but obtains only data on the symbol 5 and the symbol 6.

In this embodiment, a quantity of RBs used in the subframe n+1 is the same as a quantity of RBs in the subframe n, but the target data that has not been sent and that is on the preempted OFDM symbol of the UE 1 is transmitted only on k OFDM symbols, where k is a natural number and is equal to a quantity of preempted OFDM symbols in the subframe n. Locations of the k OFDM symbols may be in the following manners:

Manner 1: The locations of the k OFDM symbols are the same as locations of preempted OFDM symbols in the subframe n. This manner is a predefined manner. It is predefined that the locations of the k OFDM symbols are the same as the locations of the preempted OFDM symbols in the subframe n. For example, when an OFDM symbol 5 and an OFDM symbol 6 are preempted in the subframe n, data that has not been sent in the subframe n is sent on an OFDM symbol 5 and an OFDM symbol 6 in the subframe n+1.

Manner 2: The locations of the k OFDM symbols are different from locations of preempted OFDM symbols in the subframe n, and are indicated by using the downlink control information. In this case, the indication information is further used to indicate the locations of the OFDM symbols used for retransmission in the subframe n+1.

The UE receives, in the subframe n+1, data on the k OFDM symbols that are predefined or indicated by the base station, and performs joint decoding on the data received in the subframe n+1 and the data (except the data on the preempted OFDM symbols) received in the subframe n. It may be learned that in this embodiment, after receiving a downlink subframe, the UE buffers original time-frequency domain information of the data for combination, demodulation, and decoding in a plurality of subframes, so as to improve receiving performance.

In this embodiment, a same quantity of OFDM symbols are used to retransmit the target data, and the target data is carried in two subframes in a same manner, so as to improve a receiving speed and joint-decoding efficiency.

The downlink transmission method of the present invention is described above by using the several embodiments, and the several retransmission manners in the method are described. By means of multi-subframe joint transmission, the location of the at least one OFDM symbol in the subframe n is indicated in the downlink control information in the subframe n+1, so that the terminal may perform a corresponding operation according to the indication information, for example, discard the data that is received on the at least one indicated OFDM symbol in the subframe n, and retransmit, in the subframe n+k, partial data or all data in the subframe n. Therefore, correct receiving of the terminal is ensured, a delay is reduced, and a current system technical problem in which a transmission failure of the terminal and a delay increase are caused because a low-delay service preempts a data RE of the terminal is resolved.

To better implement the foregoing solutions in the embodiments of the present invention, the following further provides related apparatuses configured to cooperatively implement the foregoing solutions.

(Embodiment 2)

Figure 9:
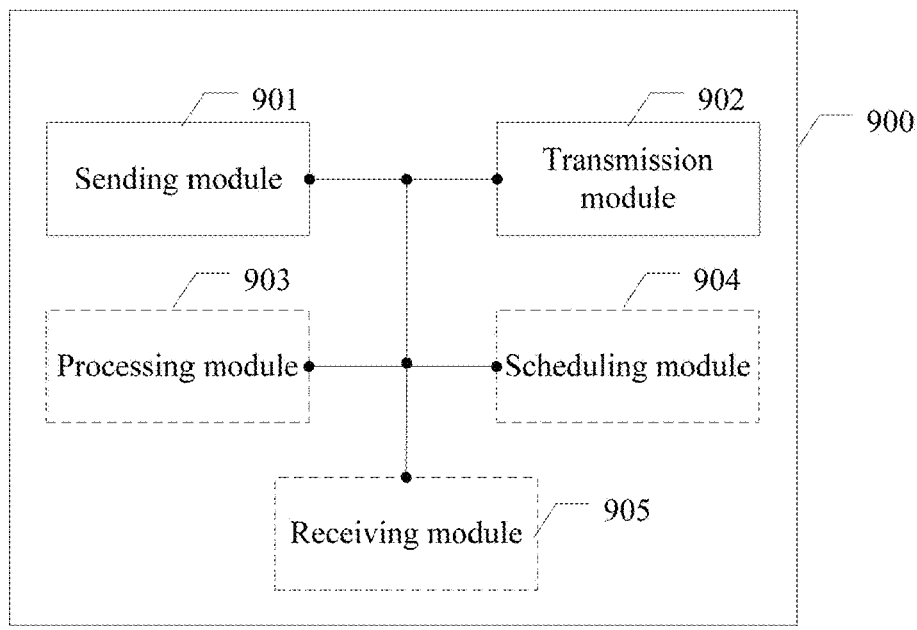
FIG. 9 is a schematic structural diagram of a base station according to an embodiment of the present invention.

Referring to FIG. 9, an embodiment of the present invention provides a base station 900 that may include a sending module 901, configured to send downlink control information to a terminal in a subframe n+k, where the downlink control information includes indication information and a hybrid automatic repeat request HARQ process identification. The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n, and both n and k are natural numbers. The base station 900 may further include a transmission module 902, configured to transmit, in the subframe n+k, at least data that is sent to the terminal and that is on the at least one OFDM symbol that is in the subframe n and that is indicated by the indication information.

In some embodiments, the transmission module 902 is specifically configured to retransmit all data in the subframe n to the terminal in the subframe n+k.

In some embodiments, the transmission module 902 is specifically configured to: in the subframe n+k, add, to at least one resource block, modulated and coded data that is sent to the terminal and that is on the at least one OFDM symbol that is in the subframe n and that is indicated by the indication information, and retransmit the data to the terminal.

In some embodiments, the base station 900 further includes a processing module 903, configured to fill an idle resource element of the at least one resource block with 0.

In some embodiments, the transmission module 902 is specifically configured to: in the subframe n+k, add, to at least one OFDM symbol, modulated and coded data that is sent to the terminal and that is on the at least one OFDM symbol that is in the subframe n and that is indicated by the indication information, and retransmit the data to the terminal.

In some embodiments, a location of the OFDM symbol used for retransmission in the subframe n+k is the same as the location of the OFDM symbol indicated by the indication information; or a location of the OFDM symbol used for retransmission in the subframe n+k is different from the location of the OFDM symbol indicated by the indication information, and the indication information is further used to indicate the location of the OFDM symbol used for retransmission in the subframe n+k.

In some embodiments, the indication information is information in a bitmap format. Each bit in the indication information is corresponding to one OFDM symbol used to transmit data, and 1 or 0 is used to indicate whether a corresponding OFDM symbol is indicated. Alternatively, each bit in the indication information is corresponding to one group of OFDM symbols used to transmit data, 1 or 0 is used to indicate whether a corresponding group of OFDM symbols are indicated, and the group of OFDM symbols include at least two consecutive OFDM symbols. Alternatively, each bit in the indication information is corresponding to two OFDM symbols used to transmit data, 1 or 0 is used to indicate whether two corresponding OFDM symbols are indicated, and the two OFDM symbols are two OFDM symbols that are in two timeslots in the subframe n and that have a same sequence number.

In some embodiments, the indication information includes a start location of a plurality of consecutive OFDM symbols used to transmit data, and further includes an end location or a length of the plurality of consecutive OFDM symbols.

In some embodiments, the base station 900 further includes a scheduling module 904, configured to preempt at least one OFDM symbol of the terminal in the subframe n, where the indication information is specifically used to indicate a location of the at least one preempted OFDM symbol.

In some embodiments, the base station 900 further includes a receiving module 905, configured to receive feedback information that is fed back by the terminal for the subframe n and the subframe n+k according to a timing relationship in the subframe n+k, where the feedback information is an acknowledgment ACK or a negative acknowledgment NACK.

It should be noted that the function modules of the base station 900 may be corresponding to specific hardware structures. For example, the sending module 901 and the transmission module 902 may be corresponding to a transmitter, the processing module 903 and the scheduling module 904 may be corresponding to a processor, and the receiving module 905 may be corresponding to a receiver. The function modules are implemented by their respective corresponding hardware units.

It may be understood that functions of the function modules of the base station in this embodiment of the present invention may be specifically implemented according to the method in the foregoing method embodiment. For a specific implementation process thereof, refer to the related descriptions in the foregoing method embodiment. Details are not described herein again.

It may be learned from the foregoing that in some feasible implementations of the present invention, the base station sends the indication information to the terminal in the subframe n+k, to instruct the terminal to perform a corresponding operation according to the indication information, for example, to discard data that is received on the at least one indicated OFDM symbol in the subframe n, and retransmits the data to the terminal in the subframe n+k. Therefore, correct receiving of the terminal is ensured, a retransmission delay is reduced, and receiving performance of the terminal is improved.

(Embodiment 3)

Figure 10:
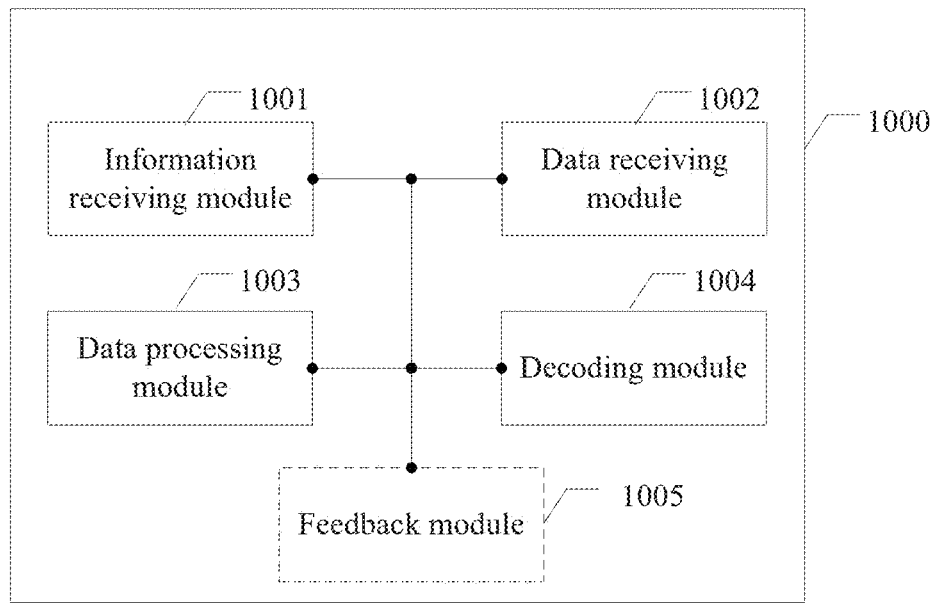
FIG. 10 is a schematic structural diagram of a terminal according to an embodiment of the present invention.

Referring to FIG. 10, an embodiment of the present invention provides a terminal 1000 that may include an information receiving module 1001, configured to receive downlink control information that is sent by a base station in a subframe n+k. Both n and k are natural numbers, the downlink control information includes indication information and a hybrid automatic repeat request HARQ process identification, the indication information is used to indicate a location of at least one orthogonal frequency division multiplexing OFDM symbol in data that is sent by the base station to the terminal in a subframe n, and the HARQ process identification in the downlink control information is the same as a HARQ process identification in the subframe n. The terminal 1000 further includes a data receiving module 1002, configured to receive data that is transmitted by the base station in the subframe n+k, that is sent to the terminal, and that is on the at least one OFDM symbol that is in the subframe n and that is indicated by the indication information. The terminal 1000 further includes a data processing module 1003, configured to discard, according to the indication information, data that is on the at least one OFDM symbol indicated by the indication information and that is in the data received in the subframe n. The terminal 1000 further includes a decoding module 1004, configured to perform joint decoding on the data received in the subframe n and the data received in the subframe n+k.

In some embodiments, the terminal 1000 further includes a feedback module 1005, configured to feed back feedback information for the subframe n and the subframe n+k according to a timing relationship in the subframe n+k, where the feedback information is an acknowledgment ACK or a negative acknowledgment NACK.

In some embodiments, the indication information is specifically used to indicate a location of at least one OFDM symbol that is of the terminal and that is preempted by the base station in the subframe n.

In some embodiments, the data receiving module 1002 is specifically configured to receive all data that is in the subframe n and that is retransmitted by the base station in the subframe n+k.

In some embodiments, the data receiving module 1002 is specifically configured to receive modulated and coded data that is retransmitted by the base station in at least one resource block in the subframe n+k, that is sent to the terminal, and that is on the at least one OFDM symbol that is in the subframe n and that is indicated by the indication information.

In some embodiments, an idle resource element RE of the at least one resource block is filled with 0.

In some embodiments, the data receiving module 1002 is specifically configured to receive modulated and coded data that is retransmitted by the base station on at least one OFDM symbol in the subframe n+k, that is sent to the terminal, and that is on the at least one OFDM symbol that is in the subframe n and that is indicated by the indication information.

In some embodiments, a location of the OFDM symbol used for retransmission in the subframe n+k is the same as the location of the OFDM symbol indicated by the indication information; or a location of the OFDM symbol used for retransmission in the subframe n+k is different from the location of the OFDM symbol indicated by the indication information, and the indication information is further used to indicate the location of the OFDM symbol used for retransmission in the subframe n+k.

In some embodiments, the indication information is information in a bitmap format. Each bit in the indication information is corresponding to one OFDM symbol used to transmit data information, and 1 or 0 is used to indicate whether a corresponding OFDM symbol is preempted. Alternatively, each bit in the indication information is corresponding to one group of OFDM symbols used to transmit data information, 1 or 0 is used to indicate whether a corresponding group of OFDM symbols are preempted, and the group of OFDM symbols include at least two consecutive OFDM symbols. Alternatively, each bit in the indication information is corresponding to two OFDM symbols used to transmit data information, 1 or 0 is used to indicate whether two corresponding OFDM symbols are preempted, and the two OFDM symbols are two OFDM symbols that are in two timeslots in the subframe n and that have a same sequence number.

In some embodiments, the indication information includes a start location of a plurality of consecutive OFDM symbols used to transmit data information, and further includes an end location or a length of the plurality of consecutive preempted OFDM symbols.

It should be noted that the function modules of the terminal 1000 may be corresponding to specific hardware structures. For example, the information receiving module 1001 and the data receiving module 1002 may be corresponding to a receiver, the data processing module 1003 may be corresponding to the receiver or a processor, the decoding module 1004 may be corresponding to the processor, and the feedback module 1005 may be corresponding to a transmitter. The function modules are implemented by their respective corresponding hardware units.

It may be understood that functions of the function modules of the base station in this embodiment of the present invention may be specifically implemented according to the method in the foregoing method embodiment. For a specific implementation process thereof, refer to the related descriptions in the foregoing method embodiment. Details are not described herein again.

It may be learned from the foregoing that in some feasible implementations of the present invention, the base station sends the indication information to the terminal in the subframe n+k, to instruct the terminal to perform a corresponding operation according to the indication information, for example, to discard the data that is received on the at least one indicated OFDM symbol in the subframe n, and retransmits the data to the terminal in the subframe n+k. Therefore, correct receiving of the terminal is ensured, a retransmission delay is reduced, and receiving performance of the terminal is improved.

(Embodiment 4)

Figure 11:
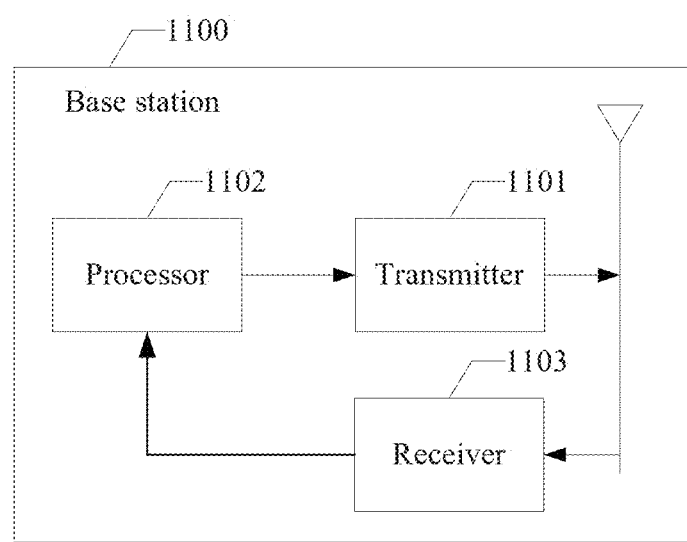
FIG. 11 is a schematic structural diagram of a base station according to another embodiment of the present invention.

Referring to FIG. 11, an embodiment of the present invention provides a base station 1100, and the base station 1100 may include a transmitter 1101, configured to send downlink control information to a terminal in a subframe n+k. The downlink control information includes indication information and a hybrid automatic repeat request HARQ process identification. The indication information is used to indicate a location of at least one orthogonal frequency division multiplexing OFDM symbol in data that is sent by the base station to the terminal in a subframe n. The HARQ process identification in the downlink control information is the same as a HARQ process identification in the subframe n, and both n and k are natural numbers. The transmitter 1101 is further configured to transmit, in the subframe n+k, at least data that is sent to the terminal and that is on the at least one OFDM symbol that is in the subframe n and that is indicated by the indication information.

In some embodiments, the transmitter 1101 is specifically configured to retransmit all data in the subframe n to the terminal in the subframe n+k.

In some embodiments, the transmitter 1101 is specifically configured to: in the subframe n+k, add, to at least one resource block, modulated and coded data that is sent to the terminal and that is on the at least one OFDM symbol that is in the subframe n and that is indicated by the indication information, and retransmit the data to the terminal.

In some embodiments, the base station 1100 may further include a processor 1102, configured to fill an idle resource element RE of the at least one resource block with 0.

In some embodiments, the transmitter 1101 is specifically configured to: in the subframe n+k, add, to at least one OFDM symbol, modulated and coded data that is sent to the terminal and that is on the at least one OFDM symbol that is in the subframe n and that is indicated by the indication information, and retransmit the data to the terminal.

In some embodiments, a location of the OFDM symbol used for retransmission in the subframe n+k is the same as the location of the OFDM symbol indicated by the indication information; or a location of the OFDM symbol used for retransmission in the subframe n+k is different from the location of the OFDM symbol indicated by the indication information, and the indication information is further used to indicate the location of the OFDM symbol used for retransmission in the subframe n+k.

In some embodiments, the indication information is information in a bitmap format. Each bit in the indication information is corresponding to one OFDM symbol used to transmit data information, and 1 or 0 is used to indicate whether a corresponding OFDM symbol is indicated. Alternatively, each bit in the indication information is corresponding to one group of OFDM symbols used to transmit data information, 1 or 0 is used to indicate whether a corresponding group of OFDM symbols are indicated, and the group of OFDM symbols include at least two consecutive OFDM symbols. Alternatively, each bit in the indication information is corresponding to two OFDM symbols used to transmit data information, 1 or 0 is used to indicate whether two corresponding OFDM symbols are indicated, and the two OFDM symbols are two OFDM symbols that are in two timeslots in the subframe n and that have a same sequence number.

In some embodiments, the indication information includes a start location of a plurality of consecutive OFDM symbols used to transmit data information, and further includes an end location or a length of the plurality of consecutive OFDM symbols.

In some embodiments, the processor 1102 is further configured to preempt at least one OFDM symbol of the terminal in the subframe n, where the indication information is specifically used to indicate a location of the at least one preempted OFDM symbol.

In some embodiments, the base station 1100 may further include a receiver 1103, configured to receive feedback information that is fed back by the terminal for the subframe n and the subframe n+k according to a timing relationship in the subframe n+k, where the feedback information is an acknowledgment ACK or a negative acknowledgment NACK.

It may be understood that functions of the modules of the base station in this embodiment of the present invention may be specifically implemented according to the method in the foregoing method embodiment. For a specific implementation process thereof, refer to the related descriptions in the foregoing method embodiment. Details are not described herein again.

It may be learned from the foregoing that in some feasible implementations of the present invention, by means of multi-subframe joint transmission, the location of the at least one OFDM symbol in the subframe n is indicated in the downlink control information in the subframe n+k, so that the terminal may perform a corresponding operation according to the indication information, for example, discard data that is received on the at least one indicated OFDM symbol in the subframe n, and retransmit, in the subframe n+k, partial data or all data in the subframe n. Therefore, correct receiving of the terminal is ensured, a delay is reduced, and a prior-art technical problem in which a transmission failure of the terminal and a delay increase are caused because a low-delay service preempts a data RE of the terminal is resolved.

(Embodiment 5)

Figure 12:
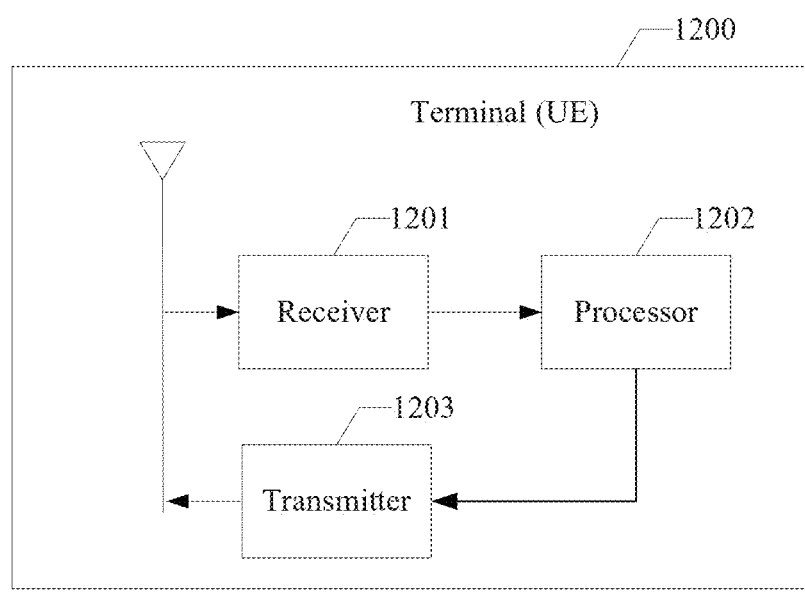
FIG. 12 is a schematic structural diagram of a terminal according to another embodiment of the present invention.

Referring to FIG. 12, an embodiment of the present invention provides a terminal 1200 that may include a receiver 1201, configured to receive downlink control information that is sent by a base station in a subframe n+k, where both n and k are natural numbers. The downlink control information includes indication information and a HARQ process identification, the indication information is used to indicate a location of at least one OFDM symbol in data that is sent by the base station to the terminal in a subframe n. The HARQ process identification in the downlink control information is the same as a HARQ process identification in the subframe n. The receiver 1201 is further configured to receive data that is transmitted by the base station in the subframe n+k, that is sent to the terminal, and that is on the at least one OFDM symbol that is in the subframe n and that is indicated by the indication information. The receiver 1201 is further configured to discard, according to the indication information, data that is on the at least one OFDM symbol indicated by the indication information and that is in the data received in the subframe n. The terminal 1200 further includes a processor 1202, configured to perform joint decoding on the data received in the subframe n and the data received in the subframe n+k.

In some embodiments, the terminal 1200 further includes a transmitter 1203, configured to feed back feedback information for the subframe n and the subframe n+k according to a timing relationship in the subframe n+k, where the feedback information is an acknowledgment ACK or a negative acknowledgment NACK.

In some embodiments, the indication information is specifically used to indicate a location of at least one OFDM symbol that is of the terminal and that is preempted by the base station in the subframe n.

In some embodiments, the receiver 1201 is specifically configured to receive, all data that is in the subframe n and that is retransmitted by the base station in the subframe n+k.

In some embodiments, the receiver 1201 is specifically configured to receive modulated and coded data that is retransmitted by the base station in at least one resource block in the subframe n+k, that is sent to the terminal, and that is on the at least one OFDM symbol that is in the subframe n and that is indicated by the indication information.

In some embodiments, an idle resource element of the at least one resource block is filled with 0.

In some embodiments, the receiver 1201 is specifically configured to receive modulated and coded data that is retransmitted by the base station on at least one OFDM symbol in the subframe n+k, that is sent to the terminal, and that is on the at least one OFDM symbol that is in the subframe n and that is indicated by the indication information.

In some embodiments, a location of the OFDM symbol used for retransmission in the subframe n+k is the same as the location of the OFDM symbol indicated by the indication information; or a location of the OFDM symbol used for retransmission in the subframe n+k is different from the location of the OFDM symbol indicated by the indication information, and the indication information is further used to indicate the location of the OFDM symbol used for retransmission in the subframe n+k.

In some embodiments, the indication information is information in a bitmap format. Each bit in the indication information is corresponding to one OFDM symbol used to transmit data information, and 1 or 0 is used to indicate whether a corresponding OFDM symbol is indicated. Alternatively, each bit in the indication information is corresponding to one group of OFDM symbols used to transmit data information, 1 or 0 is used to indicate whether a corresponding group of OFDM symbols are indicated, and the group of OFDM symbols include at least two consecutive OFDM symbols. Alternatively, each bit in the indication information is corresponding to two OFDM symbols used to transmit data information, 1 or 0 is used to indicate whether two corresponding OFDM symbols are indicated, and the two OFDM symbols are two OFDM symbols that are in two timeslots in the subframe n and that have a same sequence number.

In some embodiments, the indication information includes a start location of a plurality of consecutive OFDM symbols used to transmit data information, and further includes an end location or a length of the plurality of consecutive OFDM symbols.

It may be understood that functions of the modules of the terminal in this embodiment of the present invention may be specifically implemented according to the method in the foregoing method embodiment. For a specific implementation process thereof, refer to the related descriptions in the foregoing method embodiment. Details are not described herein again.

It may be learned from the foregoing that in some feasible implementations of the present invention, by means of multi-subframe joint transmission, the location of the at least one OFDM symbol in the subframe n is indicated in the downlink control information in the subframe n+k, so that the terminal may perform a corresponding operation according to the indication information, for example, discard the data that is received on the at least one indicated OFDM symbol in the subframe n, and retransmit, in the subframe n+k, partial data or all data in the subframe n. Therefore, correct receiving of the terminal is ensured, a delay is reduced, and a prior-art technical problem in which a transmission failure of the terminal and a delay increase are caused because a low-delay service preempts a data RE of the terminal is resolved.

(Embodiment 6)

Referring to FIG. 1, an embodiment of the present invention provides a communications system 100. The communications system 100 may include a base station 110 and a terminal (terminal) 120. The base station 110 is the base station according to Embodiment 4 of the present invention, and the terminal is the terminal according to Embodiment 5 of the present invention.

In the foregoing embodiments, the descriptions of the embodiments have respective focuses. For a part that is not described in detail in an embodiment, refer to related descriptions in other embodiments.

It should be noted that, for ease of description, the foregoing method embodiment is described as a series of action combinations. However, a person skilled in the art should understand that the present invention is not limited to the described sequence of the actions, because some steps may be performed in another sequence or performed at the same time according to the present invention. In addition, a person skilled in the art should also appreciate that all the embodiments described in the specification are example embodiments, and the related actions and modules are not necessarily mandatory to the present invention.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

A person of ordinary skill in the art may understand that all or some of the steps in the method in the embodiments may be implemented by a program instructing relevant hardware. The program may be stored in a computer readable storage medium. The storage medium may include: a ROM, a RAM, a magnetic disk, an optical disc, or the like.

The downlink transmission method, the base station, and the terminal provided in the embodiments of the present invention are described in detail above. The principle and the implementations of the present invention are described herein by using specific examples. The description about the foregoing embodiments is merely provided to help understand the method and core ideas of the present invention. In addition, a person of ordinary skill in the art can make variations and modifications in terms of the specific implementations and application scopes according to the ideas of the present invention. Therefore, the content of the specification shall not be construed as a limit to the present invention.

What is claimed is:

1. A method, comprising:
   receiving, by a terminal, first data from a base station in a subframe n, where n is a natural number;
   receiving, by the terminal, downlink control information from the base station in a subframe n+k, wherein k is a natural number, wherein the downlink control information comprises indication information and a hybrid automatic repeat request (HARQ) process identification, the indication information indicates a location of at least one orthogonal frequency division multiplexing (OFDM) symbol in the first data, the HARQ process identification in the downlink control information is the same as a HARQ process identification in the subframe n, the indication information is a bitmap format, each bit in the indication information corresponds to two OFDM symbols used to transmit data information, a 1 or a 0 is used to indicate whether two corresponding OFDM symbols are preempted, and the two OFDM symbols are two OFDM symbols that are in two timeslots in the subframe n and have a same sequence number;
   receiving, by the terminal, second data from the base station in the subframe n+k, wherein the second data is the same as data that was allocated to be sent to the terminal on the at least one OFDM symbol in the subframe n;
   discarding, by the terminal according to the indication information, third data on the at least one OFDM symbol indicated by the indication information from the first data received in the subframe n; and
after discarding the third data, performing, by the terminal, joint decoding on remaining portions of the first data and the second data.

2. The method according to claim 1, further comprising:
feeding back, by the terminal, feedback information for the subframe n and the subframe n+k according to a timing relationship in the subframe n+k, wherein the feedback information is an acknowledgment (ACK) or a negative acknowledgment (NACK).

3. The method according to claim 1, wherein
the indication information indicates a location of at least one OFDM symbol of the terminal that is preempted by the base station in the subframe n.

4. The method according to claim 1, wherein receiving, by the terminal, the second data from the base station in the subframe n+k comprises:
receiving, by the terminal from the base station in the subframe n+k, all data that was allocated to be sent to the terminal.

5. The method according to claim 1, wherein receiving, by the terminal, the second data from the base station in the subframe n+k comprises:
receiving, by the terminal, modulated and coded data transmitted by the base station in at least one resource block in the subframe n+k.

6. The method according to claim 5, wherein an idle resource element of the at least one resource block is filled with 0.

7. The method according to claim 1, wherein receiving, by the terminal, data from the base station in the subframe n+k comprises:
receiving, by the terminal, modulated and coded data transmitted by the base station on at least one OFDM symbol in the subframe n+k.

8. The method according to claim 7, wherein
a location of the at least one OFDM symbol used for transmission in the subframe n+k is the same as the location of the at least one OFDM symbol indicated by the indication information; or
a location of the at least one OFDM symbol used for retransmission in the subframe n+k is different from the location of the at least one OFDM symbol indicated by the indication information, and the indication information further indicates the location of the at least one OFDM symbol used for transmission in the subframe n+k.

9. The method according to claim 1, wherein the indication information comprises:
a start location of a plurality of consecutive preempted OFDM symbols used to transmit data; and
an end location of the plurality of consecutive preempted OFDM symbols or a length of the plurality of consecutive preempted OFDM symbols.

10. A base station, comprising:
a processor; and
a transmitter, configured to:
send first data to a terminal in a subframe n, wherein n is a natural number;
send downlink control information to the terminal in a subframe n+k, wherein the downlink control information comprises indication information and a hybrid automatic repeat request (HARQ) process identification, the indication information is used to indicate a location of at least one orthogonal frequency division multiplexing (OFDM) symbol in the first data, the HARQ process identification in the downlink control information is the same as a HARQ process identification in the subframe n, k is a natural number, the indication information is a bitmap format, each bit in the indication information corresponds to two OFDM symbols used to transmit data information, a 1 or a 0 is used to indicate whether two corresponding OFDM symbols are preempted, and the two OFDM symbols are two OFDM symbols that are in two timeslots in the subframe n and have a same sequence number; and
send at least second data in the subframe n+k to the terminal, wherein the second data is the same as data that was allocated to be sent to the terminal on the at least one OFDM symbol in the subframe n.

11. The base station according to claim 10, wherein
the transmitter is configured to send the at least second data in the subframe n+k by transmiting, to the terminal in the subframe n+k, all data that was allocated to be sent to the terminal in the subframe n.

12. The base station according to claim 10, wherein
the transmitter is configured to send the at least second data in the subframe n+k by adding, in the subframe n+k, modulated and coded data to at least one resource block.

13. The base station according to claim 10, wherein
the transmitter is configured to send the at least second data in the subframe n+k by adding, add, in the subframe n+k, modulated and coded data to at least one OFDM symbol.

14. An apparatus, comprising:
a receiver, configured to:
receive first data from a base station in a subframe n, wherein n is a natural number;
receive downlink control information from the base station in a subframe n+k, wherein k is a natural number, wherein the downlink control information comprises indication information and a hybrid automatic repeat request (HARQ) process identification, the indication information indicates a location of at least one orthogonal frequency division multiplexing (OFDM) symbol in the first data, the HARQ process identification in the downlink control information is the same as a HARQ process identification in the subframe n, the indication information is a bitmap format, each bit in the indication information corresponds to two OFDM symbols used to transmit data information, a 1 or a 0 is used to indicate whether two corresponding OFDM symbols are preempted, and the two OFDM symbols are two OFDM symbols that are in two timeslots in the subframe n and have a same sequence number; and
receive second data from the base station in the subframe n+k, wherein the second data is the same as data that was allocated to be sent to the apparatus on the at least one OFDM symbol in the subframe n;
a processor; and
a non-transitory computer-readable storage medium storing a program to be executed by the processor, the program including instructions for:
discarding, according to the indication information, third data that is on the at least one OFDM symbol indicated by the indication information from the first data received in the subframe n; and
after discarding the third data, perform joint decoding on a remaining portion of the first data and the second data.

15. The apparatus according to claim 14, further comprising:
 a transmitter, configured to feed back feedback information for the subframe n and the subframe n+k according to a timing relationship in the subframe n+k, wherein the feedback information is an acknowledgment (ACK) or a negative acknowledgment (NACK).

16. The apparatus according to claim 14, wherein
 the indication information indicates a location of at least one OFDM symbol of the apparatus and is preempted by the base station in the subframe n.

17. The apparatus according to claim 14, wherein
 the receiver is configured to receive, from the base station in the subframe n+k, all data that was allocated to be sent to the apparatus is in the subframe n.

18. The apparatus according to claim 14, wherein
 the receiver is configured to receive the second data from the base station by receiving modulated and coded data transmitted by the base station in at least one resource block in the subframe n+k.

19. The apparatus according to claim 14, wherein
 the receiver is configured to receive the second data from the base station by receiving modulated and coded data from the base station on at least one OFDM symbol in the subframe n+k.

* * * * *